UNITED STATES PATENT OFFICE.

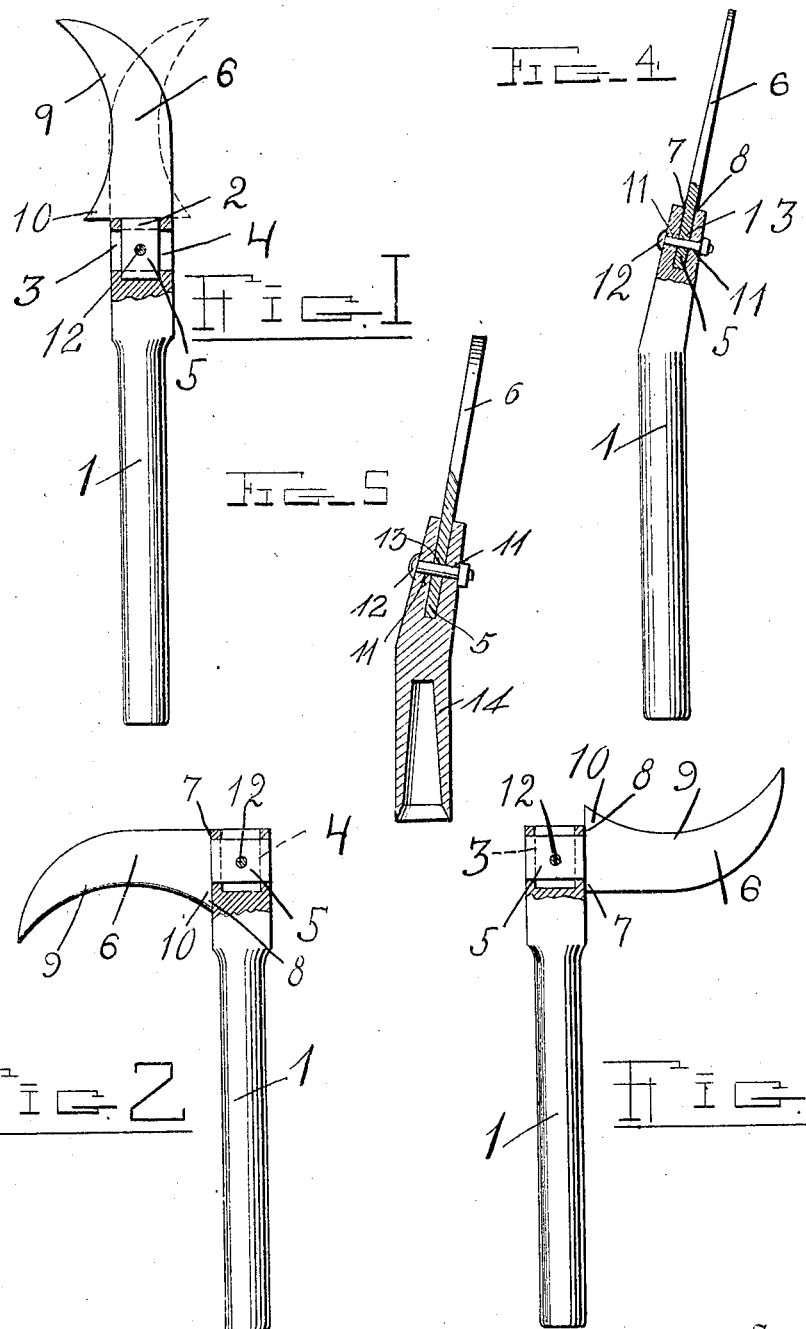

JOHN H. HENSON, OF COOLEY, OKLAHOMA TERRITORY.

KNIFE.

No. 870,678.
Specification of Letters Patent.
Patented Nov. 12, 1907.

Application filed January 29, 1907. Serial No. 354,744.

*To all whom it may concern:*

Be it known that I, JOHN H. HENSON, a citizen of the United States, residing at Cooley, in the county of Woodward and Territory of Oklahoma, have invented certain new and useful Improvements in Knives; and I do declare the following to be a full, clear, and exact description of the invention, such as will enable others skilled in the art to which it appertains to make and use the same.
This invention relates to knives or pruning implements in which it is often desirable to vary the position or location of the cutting edge for doing more rapid and effective work.

The object of the invention is to provide a device of this kind which can be quickly changed to secure the above results and at the same time to so construct the parts that they are as rigidly secured in one position as they are in the other.

In the accompanying drawings:—Figure 1 is a side elevation, partly broken away, showing my improved knife with the blade in one position in full lines and the opposite direction in dotted lines; Figs. 2 and 3 are broken side elevations, showing the knife blade in reversed position relative to the handle; Fig. 4 is a longitudinal sectional view, taken at right angles to Fig. 2; and Fig. 5 is a longitudinal sectional view of the invention when provided with a socket for the reception of a handle.

Referring more particularly to the drawings, which are for illustrative purposes only, and are therefore not drawn to scale, 1 indicates the handle of my improved knife, which may be of any suitable material and of the proper size and length to adapt it for use. The upper end of the handle is preferably bent laterally and provided with a socket, which is provided with three openings, one of which 2 opens longitudinally of the handle and the other two 3 and 4 open laterally for the reception of the shank 5 of the blade 6. The shank of the blade is reduced relatively to the base or inner end of the knife blade so as to form shoulders 7 and 8 that are adapted to engage with the portion of the handle adjacent to whichever opening is occupied by the shank of the blade. The inner or cutting edge 9 of the blade is preferably curved and especially toward its base where it forms a substantially curved shoulder 10 that is adapted to be forced into engagement with the object being acted upon when the handle is being pushed forward lengthwise. The socketed end of the handle is provided with transverse perforations 11, through which is adapted to be extended the pin 12, the intermediate portion of the pin passing through a perforation 13 in
the shank of the blade and thereby rigidly holding the blade in position.

The perforations 11 and 13 in the handle and shank respectively are so arranged relatively to each other that whenever the shank is inserted into the handle through any one of the openings therein the openings in the handle and shank will register, so that the pin can be passed through them and thereby hold the parts in position. In other words, the perforations 11 are located exactly midway between the sides of the handle and at a point from the end of the handle equal to the distance from either side to said opening, and the perforation in the shank is located exactly midway of its width and at a distance from the shoulders equal to the distance that the perforations in the handle are from the ends and sides of the handle respectively.

In using my improved knife, the blade is inserted in the handle in accordance with the use for which the knife is intended. For instance, if the blade is to be used in a narrow or close place it is inserted in the end of the handle with either side extending to the right or left, as shown in full lines and dotted lines in Fig. 1, the blade being invertible and reversible. If a draw or thrust cut is to be made where there is plenty of room the blade is inserted into either side of the handle with the cutting edge either up or down as the case may be, the blade being reversible in the side openings the same as it is for the end opening. After the blade has been inserted as far as it will go, the pin is inserted through the perforations and the knife is in condition for use.

From the foregoing, it will be seen that the blade can occupy either one of six positions, two of which are shown in Fig. 1 and it being evident that it can occupy two upon either side.

Instead of forming the handle from one piece and forming the sockets in the end thereof, the socketed portion can be in the form of a metallic shell or body 14, as shown in Fig. 5 with its opposite end formed into a socket for the reception of a handle that can be made removable or stationary in the ordinary manner, if desired, and its intermediate portion can be bent at an angle in the same manner as shown in the other figures.

Having thus described my invention, what I claim as new and desire to secure by Letters Patent, is:—

In a knife, a bent body having a handle at one end and a socket at the other, said socket being arranged longitudinally of the body and having oppositely disposed openings communicating with its bottom, and the walls of the socket being each provided with a perforation, said openings being of the same cross sectional areas as the socket and the perforations being midway between the sides of the body and at a distance from the outer end equal to the distance from the perforations to either side, and an invertible and reversible blade having its inner end reduced to form a shank and shoulders, the shank being of substantially the same area in cross section as the socket, or said openings, and adapted to fit therein, and also perforated midway of its width and at a distance from said shoulders equal to the distance from the perforations in the body to the outer end, or to either side, and the cutting edge of the blade being curved from its tip to the shoulder upon the forward side of the shank, and a pin adapted to be passed through the perforations in the body and the perforation in the shank when the latter is seated within the socket or in either of said openings.

In testimony whereof I have hereunto set my hand in presence of two subscribing witnesses.

JOHN H. HENSON.

Witnesses:
L. H. PATTON,
BERTHA GEISMOR.